United States Patent
Mori

(10) Patent No.: US 7,712,824 B2
(45) Date of Patent: May 11, 2010

(54) CAB FOR CONSTRUCTION MACHINE

(75) Inventor: Tadashi Mori, London (GB)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/631,990

(22) PCT Filed: Jul. 8, 2005

(86) PCT No.: PCT/JP2005/012650

§ 371 (c)(1),
(2), (4) Date: Jan. 9, 2007

(87) PCT Pub. No.: WO2006/008985

PCT Pub. Date: Jan. 26, 2006

(65) Prior Publication Data

US 2007/0187991 A1     Aug. 16, 2007

(30) Foreign Application Priority Data

Jul. 16, 2004     (JP)     ................ 2004-210445

(51) Int. Cl.
*B62D 33/06* (2006.01)
(52) U.S. Cl. ............... 296/190.03; 296/190.08
(58) Field of Classification Search ............ 296/190.03, 296/190.08
See application file for complete search history.

(56) References Cited

U.S. PATENT DOCUMENTS

| | | | |
|---|---|---|---|
| 4,772,065 A * | 9/1988 | Nakata et al. | ............... 264/279 |
| 4,909,567 A | 3/1990 | Naganuma | |
| 5,280,955 A * | 1/1994 | Nelson et al. | ............... 280/756 |
| 6,203,098 B1 * | 3/2001 | Motozawa et al. | ..... 296/187.09 |
| 2001/0005092 A1 | 6/2001 | Sakyo et al. | |
| 2002/0149232 A1 | 10/2002 | Sakyo et al. | |

FOREIGN PATENT DOCUMENTS

| | | |
|---|---|---|
| CN | 1712645 A | 12/2005 |
| JP | 63-176851 U | 11/1988 |
| JP | 1-247284 A | 10/1989 |
| JP | 11-166247 A | 6/1999 |
| JP | 2001-260773 A | 9/2001 |
| JP | 2004-84393 A | 3/2004 |
| JP | 2006-2540 A | 1/2006 |

OTHER PUBLICATIONS

Chinese Office Action dated Mar. 28, 2008, issued in counterpart CN Appln. No. 200580022781.3 and English translation thereof.
German Office Action (and English translation thereof) dated Jul. 22, 2008, issued in a counterpart German Application.
Japanese Office Action dated Nov. 24, 2009 (2 pages), and English translation thereof (3 pages), issued in counterpart Japanese Application Serial No. 2006-528996.

* cited by examiner

*Primary Examiner*—Dennis H Pedder
(74) *Attorney, Agent, or Firm*—Frishauf, Holtz, Goodman & Chick, P.C.

(57) ABSTRACT

A cab for a construction machine is provided which is capable of providing a protective space to protect the operator from injury even if a transversely working external force is imposed on the cab, causing deformation of the cab. To this end, a transverse member, which is disposed at a position above an operator's seat and constitutes the framework of the cab, has a deformation inducing part located at a position outside the projected area of the central part of the operator's seat. Even if the cab is deformed by an external force, the cab is not largely deformed in a direction toward the operator.

10 Claims, 8 Drawing Sheets

5 (a)

5 (b)

6 (a)

6 (b)

7 (a)　　　　　7 (b)

CAB FOR CONSTRUCTION MACHINE

This application is a U.S. National Phase Application under 35 USC 371 of International Application PCT/JP2005/012650 filed Jul. 8, 2005.

TECHNICAL FIELD

The present invention relates to a cab for a construction machine such as hydraulic excavators and mobile cranes.

BACKGROUND ART

In a typical construction machine such as hydraulic excavators and crawler cranes, a revolving frame is mounted on lower machinery through a turning mechanism, the lower machinery having a traveling function. A work equipment and a cab are mounted on the revolving frame, so that the work equipment can be operated to carry out excavation, lifting or the like while the revolving frame turning in accordance with working conditions. In this arrangement, the cab is installed in a position adjacent to the base of the revolving frame at which the work equipment is mounted, for effectively performing operation.

The above construction machines and, particularly, hydraulic excavators are not always operated on plain lands but frequently operated on rough terrains such as unleveled lands and slopes. When a hydraulic excavator is operated in such an unstable condition, it sometimes happens that an unexpected external force or erroneous operation causes the hydraulic excavator to overturn and the cab is deformed owing to shocks occurring at the time of the overturn. Therefore, there have been demands for a structure for protecting the operator sitting on the operator's seat of the cab from an injury in the event of an overturn. Apart from cab protecting guards provided on the outer side of a cab, there have been proposed measures of reinforcing a whole cab to meet the demands. One example of the measures is disclosed in Patent Document 1. The protective structure of Patent Document 1 is formed such that a vertical stiffening material is inserted into a hollow part between an inner panel and outer panel which are the chief components of the cab, thereby preventing deformation caused by an overturning load.

Another structure has been proposed in Patent Document 2 according to which a structural member is attached which is locally elastically deformable if a load is imposed on a framework serving as an essential element of the vehicle in the event of a crash, and the load caused by a shock is absorbed by the deformation of the structural member to protect the operator.

[Patent Document 1]
Japanese Unexamined Patent Application Publication No. 11-166247

[Patent Document 2]
Japanese Unexamined Patent Application Publication No. 2001-260773

DISCLOSURE OF THE INVENTION

The Problems that the Invention is to Solve

The guards attached to the outer side of the cab are useful for preventing falling objects such as rocks falling from above from directly hitting the roof of the cab, but present the problem that they need large scale structures to provide a protection against an overturning load so that the vehicle weight itself increases and the external appearance of the vehicle is impaired. The structure for reinforcing the pillars such as disclosed in Patent Document 1 has the effect of preventing deformation but disadvantageously involves a complicated structure and leads to an increase in the weight of the cab.

In the event that the vehicle overturns, a great external force exerting in a lateral direction is imposed on the cab so that the cab receives an abrupt transverse load. The upper part (ceiling part) of the cab having a frame structure is the most likely to be pressed flat by such a transverse load. However, if a protective function works to provide a space which protects the operator within the cab from injury even when an unexpected accident occurs, the operator will avert the worst-case scenario. In view of this, the structures of the conventional cabs are designed to prevent deformation by reinforcing the transverse connecting members which connect the right and left side members, but are not intended to control the direction of deformation so as to prevent the operator from getting injured when an overturning load works on the transverse connecting members.

The present invention is directed to overcoming the foregoing problems and a primary object of the invention is therefore to provide a cab for a construction machine, the cab being capable of providing a protective space for the operator even if a lateral external force works on the cab in the event of an overturn or the like.

Means of Solving the Problems

The above object can be achieved by a cab for a construction machine according to the invention, wherein a transverse member, which constitutes the framework of the cab, has a deformation inducing part located at a position outside the projected area of a central part of an operator's seat.

In the invention, the transverse member may be disposed above the operator's seat. The deformation inducing part may be a notch formed at the lower part of a forming member that constitutes the transverse member. The transverse member may be formed from a forming member that opens in a downward direction.

THE EFFECT OF THE INVENTION

According to the invention, if an overturning load is imposed on the cab from a side thereof in the event of an unexpected accident and a compressive force caused by the overturning load acts upon the transverse member that constitutes the framework of the cab, the transverse member is deformed through the stress concentration occurring in the preliminarily provided deformation inducing part, so that the working external force is absorbed by the deformation. In spite of the deformation of the transverse member that starts from the deformation inducing part, the deformed area is out of the position of the operator sitting on the operator's cab, because the transverse member is located outside the projected area of the central part of the operator's cab. As a result, a protective space for the operator can be obtained within the cab so that the operator is not affected by the deformation.

In cases where the transverse member is disposed above the operator's seat, it is displaced from the position just above the operator's head when deformed. Further, with the provision of the notch formed as the deformation inducing part at the lower part of the forming member, the forming member functions as the transverse member when it is in a normal state and buckles and deforms effectively utilizing a stress to absorb the external force when receiving an abrupt compressive external force. By forming the transverse member from a forming member that opens downward, the transverse member is allowed to have a simple sectional configuration and therefore is able to exert the function of absorbing an abrupt external force.

EXPLANATION OF REFERENCE NUMERALS

| 10: | cab |
| 11, 12: | vertical supporting member |
| 13: | longitudinal member |
| 15: | front connecting member |
| 16: | rear connecting member |
| 18: | rear intermediate connecting member |
| 20, 20A, 20B, 20C, 20D: | intermediate connecting member |
| 21: | main element |
| 21a: | grooved portion |
| 24: | side portion |
| 25, 25A, 25B: | notch |
| 26: | strengthening rib |
| 27, 28: | reinforcing member |
| 30a, 30b: | end portion |
| 31a, 31b: | joint |
| 40: | operator |

BEST MODE FOR CARRYING OUT THE INVENTION

Referring now to the accompanying drawings, a cab for a construction machine will be described according to preferred embodiments of the invention.

First Embodiment

Figure 1:
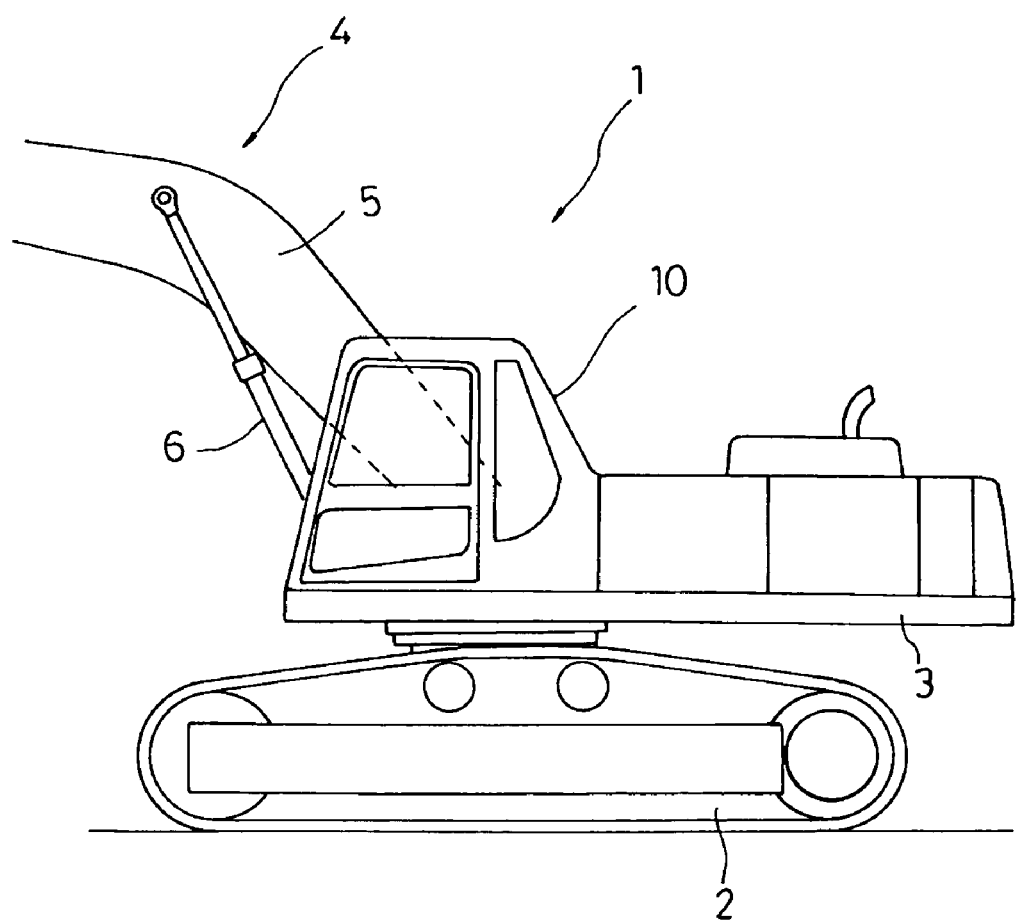
FIG. 1 A partial side view of a cab for a hydraulic excavator according to a first embodiment of the invention FIG. 2 A perspective view showing the skeletal structure of the cab of the first embodiment FIG. 3 A perspective view of a connecting member disposed on the upper part of the cab of the first embodiment FIG. 4 A schematic view of the cab when deformed FIG. 5 An overall perspective view (a) of a connecting member according to a second embodiment of the invention and a sectional view (b) of the connecting member of the second embodiment taken along line A-A of FIG. 5(a)
Figure 2:
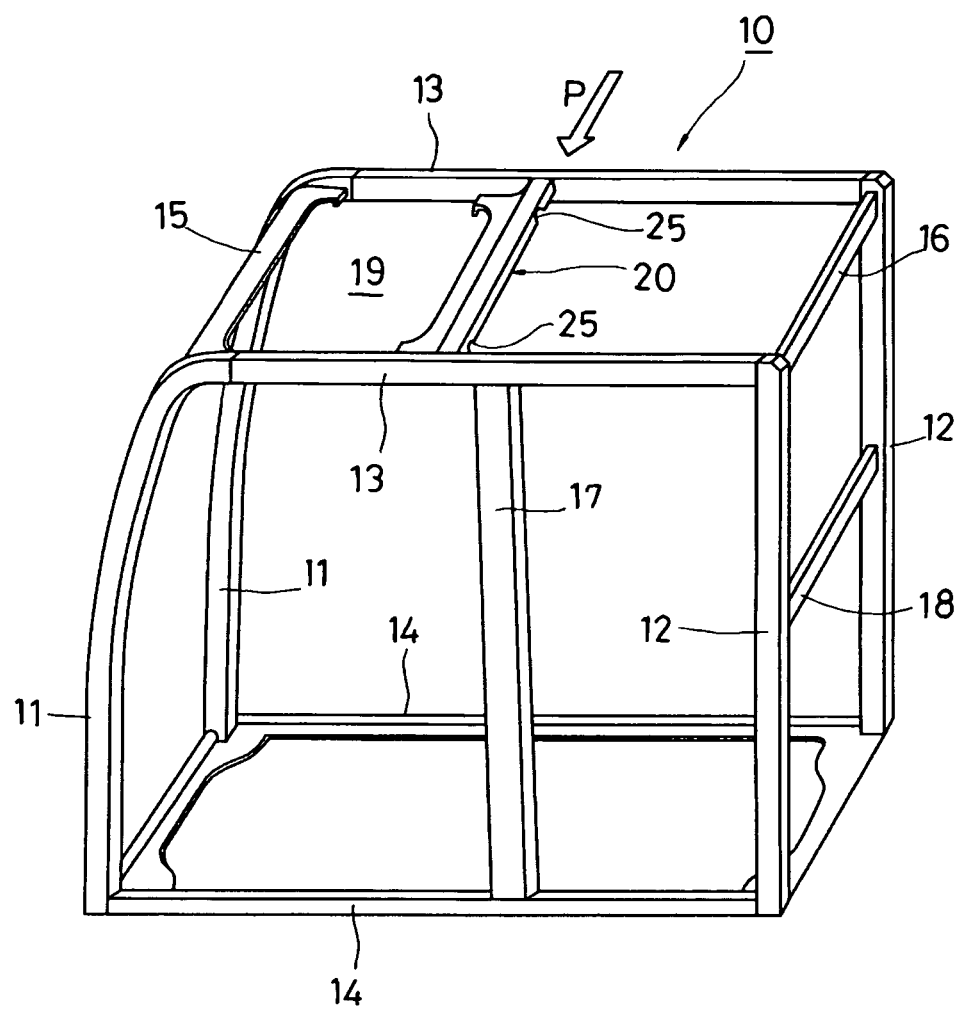
Figure 3:
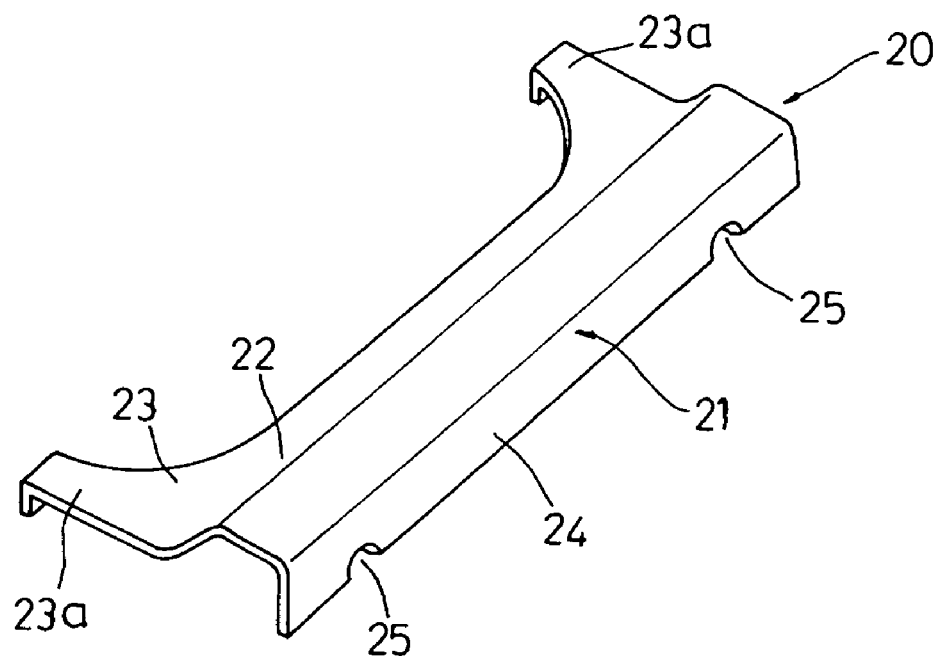

FIG. 1 is a partial side view of a hydraulic excavator constructed according to a first embodiment of the invention. FIG. 2 is a perspective view showing the skeletal structure of the cab of the hydraulic excavator according to the first embodiment, and FIG. 3 is a perspective view of a connecting member disposed on the upper part of the cab of the first embodiment.

As illustrated in FIG. 1, the hydraulic excavator 1 of the first embodiment has lower machinery 2; a revolving frame 3 that is mounted on the lower machinery 2 through a turning mechanism; a work equipment 4 of which proximal end is pivotally supported on the front upper face of the revolving frame 3; and a cab 10 mounted on the revolving frame 3 so as to adjoin the pivotally supported pivotal end of the work equipment 4. The work equipment 4 has a boom 5 of which proximal end is pivotally supported by the revolving frame 3; an arm (not shown) of which proximal end is pivotally supported on the leading end of the boom 5; and a work attachment (not shown) such as excavating buckets pivotally attached to the leading end of the arm. The boom 5 is hoisted by a boom cylinder 6, and the arm and the work attachment are swayed up and down by the arm cylinder attached to the boom 5 and an attachment hydraulic cylinder attached to the arm, respectively, so that desired work can be carried out with the work attachment. There is provided a cab 10 and the operator gets into the cab 10 to operate the work equipment 4 and the lower machinery 2.

For good operator visibility, the cab 10 is provided with not only a front window but also a big window on the side of the work equipment 4. As shown in FIG. 2, the skeletal structure of the cab 10 includes, as strengthening members, front vertical supporting members (front support posts) 11 disposed at right and left front positions and rear vertical supporting members (rear support posts) 12 disposed at right and left rear positions. The upper ends of the front vertical supporting members 11 and their corresponding rear vertical supporting members 12 are connected to each other by longitudinal members 13 respectively. The lower ends of the front vertical supporting members 11 and their corresponding rear vertical supporting members 12 are connected to each other by lower coupling members 14 respectively. The right and left front vertical supporting members 11 are connected to each other by a front connecting member (transverse member) 15. The right and left rear vertical supporting members 12 are connected to each other by a rear connecting member (transverse member) 16. The right and left longitudinal members 13 are connected to each other by an upper intermediate connecting member (transverse member) 20 disposed at an intermediate position between the front connecting member 15 and the rear connecting member 16. Further, an intermediate support column 17 is disposed upright at an intermediate position between the left longitudinal member 13 and the left lower coupling member 14. The right and left rear vertical supporting members 12 are connected to each other at the intermediate positions thereof by a rear intermediate connecting member (transverse member) 18. The external face of the skeletal structure is covered with an armoring material except the windows so that the rigidity of the whole structure is increased.

In the first embodiment, when forming the skeletal structure described above, a member having the shape shown in FIG. 3 is used as the upper intermediate connecting member (hereinafter referred to as "connecting member") 20 disposed at the substantial center of the ceiling portion. More specifically, the connecting member 20 is formed by bending one steel plate such that there are provided (i) a main element 21 having a trapezoidal section that opens at its underside; (ii) a horizontal portion 23 that is formed by bending the steel plate so as to horizontally extend from the lower end of one side 22 of the main element 21; and (iii) extending portions 23a that are located at both longitudinal ends of the horizontal portion 23, extending toward the side opposite to the main element 21, and the leading ends of the extending portions 23a are further bent downward by a desired length.

In the lower part of a side portion 24 of the connecting member 20 which side portion 24 is located opposite to the horizontal portion 23, notches 25 each having the shape of a circular arc are provided at near-end positions that are spaced apart from both longitudinal ends, respectively, in directions toward the longitudinal center by a specified distance. The notches 25 are shaped such that the section modulus of the portion passing the deepest part becomes abruptly smaller than those of other parts so that the bending stress increases in this portion. The notches 25 serve as deformation inducing parts when a transverse load P (see FIG. 2) is imposed on the upper part of the cab 10 as described later. The deformation inducing parts do not only mean parts having a small sectional area but also regions where the bending stress becomes the largest relative to the load working in a vertical direction, thereby affecting the deformation of the connecting member 20. It is preferable to make the notches 25 by cutting the side portion 24 from its underside into the shape of a circular arc of specified size. This makes it possible to prevent a breakage in this region because a concentrated power does not work therein even if an external force is imposed in a normal state.

The connecting member 20 thus formed is attached at its ends to the right and left longitudinal members 13 by welding so as to be positioned above the operator's seat when the framework is assembled. In this condition, the horizontal portion 23 of the connecting member 20 forms the rear edge of a top light forming portion 19. The right and left longitudinal members 13, which constitute the ceiling portion, are connected in an integral fashion by the front connecting member 15 disposed at the upper position of the front window and the rear connecting member 16 disposed between the rear ends of the longitudinal members 13. These members constitute the framework. An armoring material (not shown) is attached to the framework, thereby forming a roof portion, whereas an interior material (not shown) is attached to the ceiling face.

Figure 4:
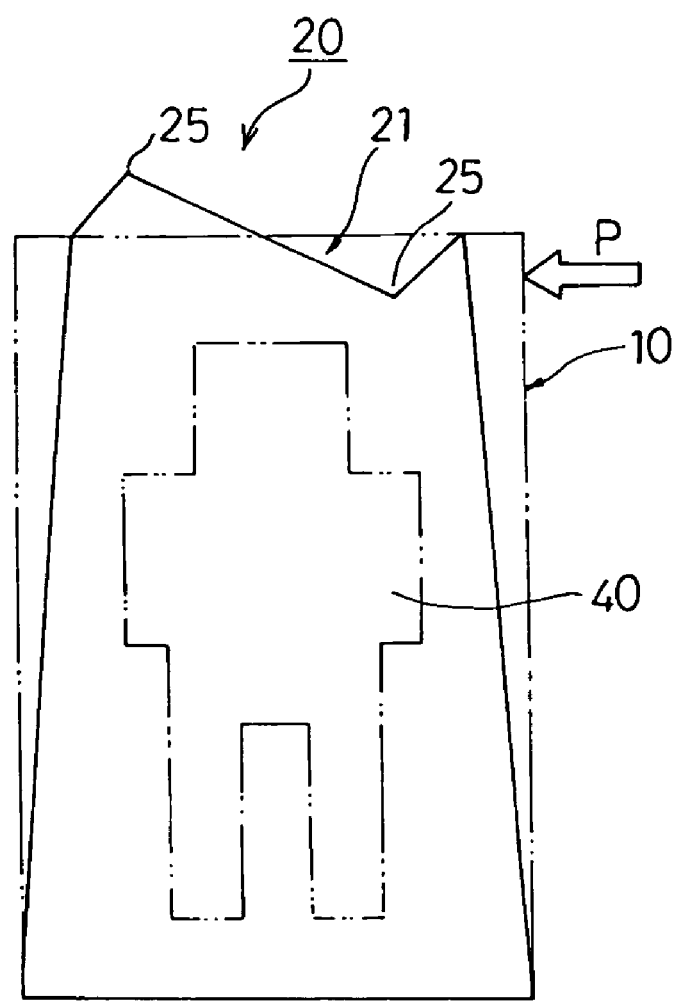

If the great transverse load P (see FIG. 2) is imposed on the upper part of the cab 10 of which framework is formed from the above-described members when the cab 10 overturns in the event of an unexpected accident, not only a twisting force but also a great external force exerted in an axial direction will act on the connecting member 20. The stress caused by this external force is concentrated on the notches 25 formed on parts of the main element 21 so that the connecting member 20 buckles and deforms at the notches 25, absorbing the imposed energy at once and therefore destruction does not expand any more. If a compressive load is imposed, exceeding its allowable limit when the connecting member 20 buckles and deforms, the notches 25 serve as the starting point of the buckling and deformation of the connecting member 20. Since the connecting member 20 is provided with the notches 25 that are formed at two positions, i.e., on both sides with respect to the width-wise direction (i.e., the length-wise direction of the connecting member 20), the connecting member 20 buckles and deforms upward at one of the notches 25 and downward at the other one of the notches 25 as illustrated in FIG. 4, so that the portion of the main element 21 situated between these notches 25 is maintained in shape and therefore does not deform unlike the conventional structure. Therefore, even if the connecting member 20 is disposed at a position just above the head of the operator 40 sitting on the operator's seat, the protective space for the operator 40 can be ensured.

It should be noted that the connecting member 20 provided for the cab 10 cooperates with other connecting members 15, 16, maintaining the steady state, when it is in the normal state so that it does not cause any obstacles. In addition, even if the main element 21 is buckled and deformed by a devastating external force when the connecting member 20 deforms at the notches 25, receiving a transverse load in the event of an overturn, the main element 21 will not be broken because the notches 25 are provided at one side of the side portion 24 of the main element 21 and the horizontal portion 23 opposite to the notched part is bent so as to extend in a horizontal direction relative to the main element 21. Therefore, the desirable effect can be attained.

Second Embodiment

Figure 5:
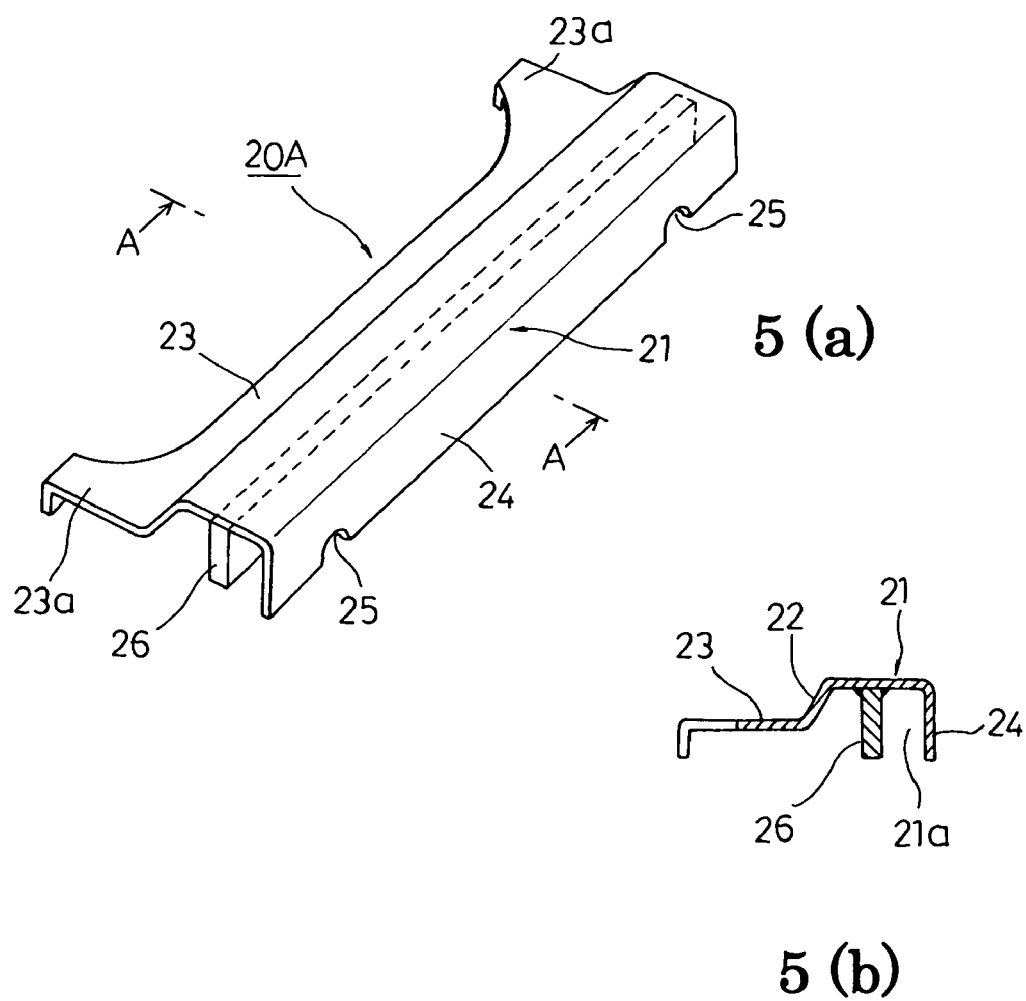

FIG. 5 shows an overall perspective view (a) of a connecting member according to a second embodiment of the invention and a sectional view (b) of the connecting member of the second embodiment taken along line A-A of FIG. 5(*a*). The connecting member 20A of the second embodiment is substantially the same as that of the first embodiment except that the connecting member 20A has a reinforcing member. In the second embodiment, the parts thereof corresponding to the first embodiment are identified by the same reference numerals and a detailed description thereof is omitted.

The connecting member 20A of the second embodiment is designed to have a strengthening rib 26 that is integrally formed with the connecting member 20A by welding so as to extend over the entire longitudinal length of a grooved portion 21*a* formed in the underside of the upper face of the main element 21. Similarly to the first embodiment, as the deformation inducing parts of the connecting member 20A having the above structure, the notches 25 are formed at two near-end positions, respectively, in the lower part of the side portion 24, the near-end positions being spaced apart from both longitudinal ends of the side portion 24, respectively, in directions toward the center by a specified distance. Like the first embodiment, the notches 25 are preferably in the shape of a circular arc.

According to the cab 10 having the connecting member 20A of the second embodiment, the sectional strength is more increased compared to the connecting member 20 of the first embodiment by the additional use of the strengthening rib 26 so that the cab 10 withstands, even if a great transverse load is imposed thereon. If a grater external force is imposed, the stress is concentrated on the deformation inducing parts, i.e., the notches 25 so that the buckling and deformation commences from the notches 25 and the imposed energy is absorbed at once so that deconstruction does not expand any more. By virtue of the notches 25 provided in the lower part of the side portion 24 as the deformation inducing parts, the connecting part 20A buckles and deforms, utilizing the notches 25 as a starting point of deformation, if a compressive load exceeding its allowable limit is imposed. In addition, notches 25 are provided at two positions, and when buckling and deformation starts from one of the notches 25, the other notch 25 substantially simultaneously starts to buckle and deform, loosing a balance, so that the shape of the portion of the main element 21 located between the notches 25 is maintained as approximately illustrated in FIG. 4. Accordingly, even if the connecting member 20A is disposed at a position above the operator's seat, it functions to provide the protective space for the operator 40.

Although the notches 25 are provided in the main element 21 in the second embodiment, they may be provided in the strengthening rib 26 that serves as a reinforcing member. It is apparent that the notches 25 may be provided for both the main element 21 and the strengthening rib 26.

Third Embodiment

Figure 6:
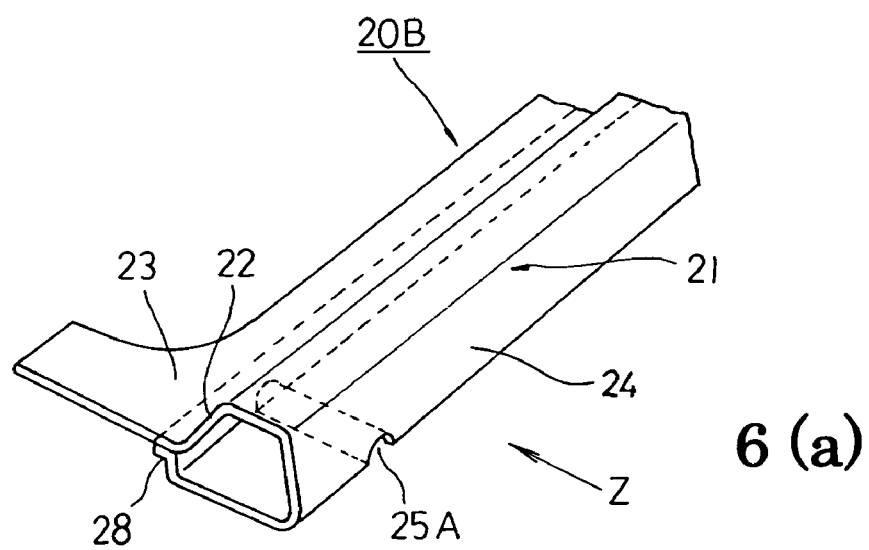
FIG. 6 A perspective view (a) of the fundamental part of a connecting member according to a third embodiment of the invention and a view (b) of the connecting member of the third embodiment when viewed along the direction of arrow Z of FIG. 6(a)
Figure 6:
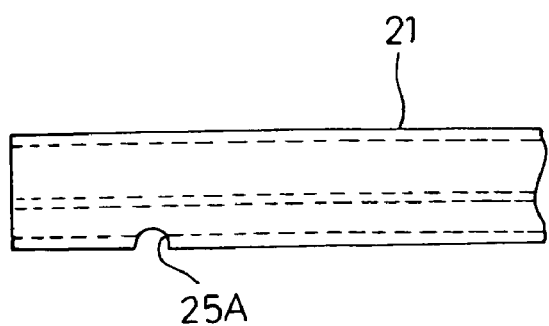

FIG. 6 shows a perspective view (a) of the fundamental part of a connecting member according to a third embodiment of the invention and a view (b) of the connecting member of the third embodiment when viewed in the direction of arrow Z of FIG. 6(a)

The connecting member 20B of the third embodiment is formed such that one side portion 22 of the main element 21 is bent in a horizontal direction at a middle part, thereby forming the horizontal portion 23. The upper face of an end portion 28, which extends from the leg end of another side 24 of the main element 21, is welded to the underside of the horizontal portion 23, such that the main element 21 has a closed box-like structure of a trapezoidal section. In the lower part of the connecting member 20B of the above structure, notches 25A are provided at two near-end positions (only one notch is shown in FIG. 6) that are spaced apart from both longitudinal ends, respectively, in directions toward the center by a specified distance.

In the cab 10 having the connecting member 20B of the above structure, since the main element 21 formed by bending a sheet material has a box-like structure, it has increased cross-sectional strength and is therefore capable of withstanding a great transverse load. If a greater external force is imposed on the cab 10 in the event of an overturn, the stress is concentrated on the deformation inducing parts, i.e., the notches 25A so that the connecting member 20B buckles and deforms at the notches 25A, thereby absorbing energy at once so that deconstruction does not expand any more. In this embodiment, a protective space for the operator can be ensured like the first and second embodiments. Since the main element 21 has a box-like structure in the third embodiment, the strength against twisting can be increased so that deformation can be prevented.

Fourth Embodiment

Figure 7:
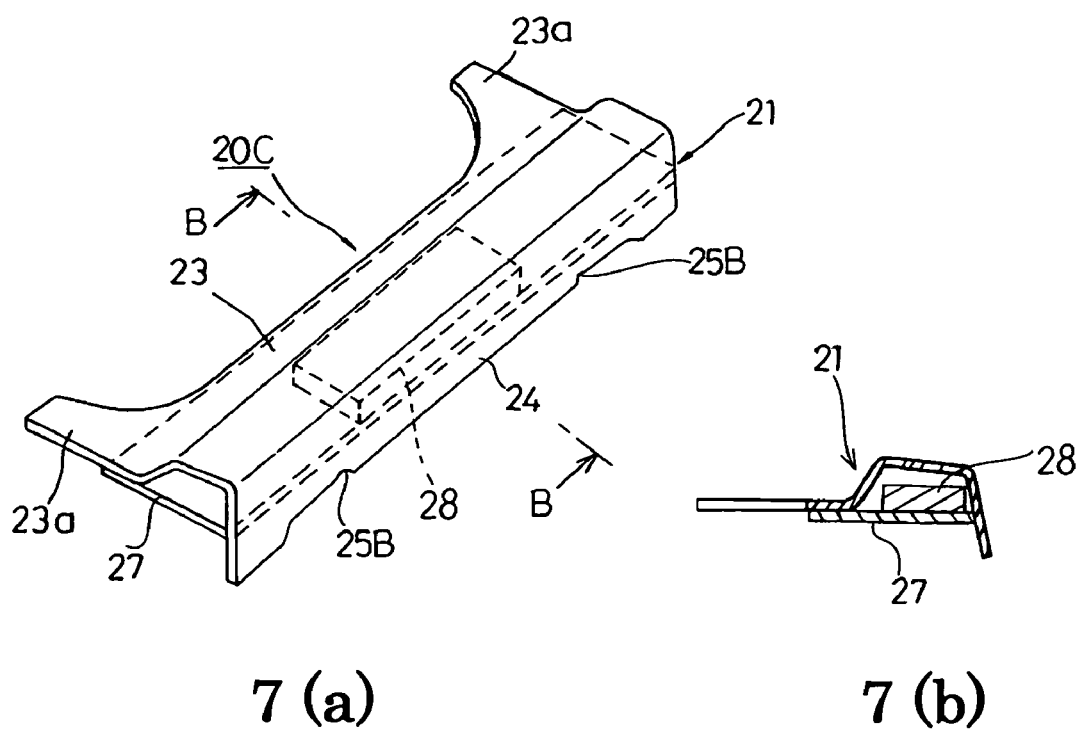
FIG. 7 An overall perspective view (a) of a connecting member according to a fourth embodiment of the invention and a sectional view (b) of the connecting member of the fourth embodiment taken along line B-B of FIG. 7(a)

FIG. 7 shows an overall perspective view (a) of a connecting member according to a fourth embodiment of the invention and a sectional view (b) of the connecting member of the fourth embodiment taken along line B-B of FIG. 7(a). In the connecting member 20C of the fourth embodiment, the parts thereof corresponding to the first embodiment are identified by the same reference numerals and a detailed description thereof is omitted.

The connecting member 20C of the fourth embodiment is formed such that a first reinforcing member 27 constituted by a flat plate is welded to the main element 21 so as to longitudinally extend, covering the trapezoidal grooved portion of the main element 21, and a second reinforcing member 28 is welded to the upper face of the longitudinal center of the first reinforcing member 27. As the deformation inducing parts of the connecting member 20C of this structure, notches 25B are provided at two near-end positions in the lower part of the side portion 24 which near-end positions are spaced apart from both longitudinal ends of the side portion 24, respectively, in directions toward the center by a specified distance. The notches 25B are shallower in shape than those of the first to third embodiments. The second reinforcing member 28 is thicker than the first reinforcing member 27. In addition, owing to the first reinforcing member 27, the main element 21 of the fourth embodiment, which is formed by bending a steel plate so as to have a trapezoidal shape in section, has a box-like structure similarly to the third embodiment, and therefore it has increased strength.

In the cab 10 having the connecting member 20C of the fourth embodiment, since the main element 21 has a box-like structure reinforced by the first reinforcing member 27 consisting of a flat plate and therefore increased sectional strength, it can withstand even if it receives a great transverse load. In addition, this box-like structure contributes to an increase in strength against a twisting force so that deformation can be prevented. Additionally, since the second reinforcing member 28 reinforces the main element 21, particularly, at the center thereof, the strength of the main element 21 at the center can be further increased. If a greater external force is imposed on the cab 10 in the event of an overturn, the stress is concentrated on the deformation inducing parts, that is, the notches 25B so that the connecting member 20C buckles and deforms at the notches 25B, thereby absorbing energy at once. In consequence, deconstruction does not expand any more. In this embodiment, a protective space for the operator can be ensured similarly to the first to third embodiments.

Fifth Embodiment

Figure 8:
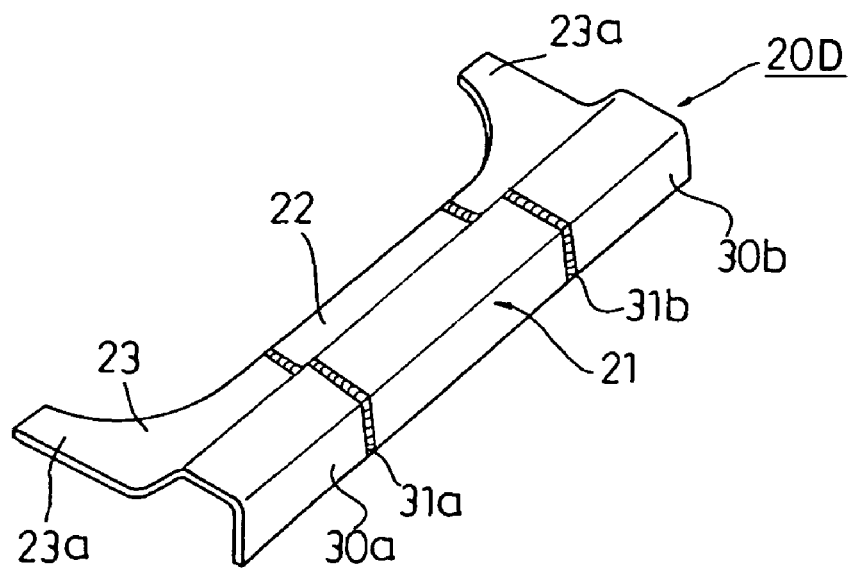
FIG. 8 An overall perspective view of a connecting member according to a fifth embodiment of the invention

FIG. 8 is an overall perspective view of a connecting member according to a fifth embodiment of the invention. In the connecting member 20D of the fifth embodiment, the parts thereof corresponding to the first embodiment are identified by the same reference numerals and a detailed description thereof is omitted.

The connecting member 20D of the fifth embodiment is constituted by the main element 21 and end portions 30a, 30b which are disposed so as to sandwich the main element 21 and formed separately from the main element 21. The main element 21 is made from a material different from that of the end portions 30a, 30b. The end portions 30a, 30b are integrally joined to the main element 21 by welding at joints 31a, 31b respectively. The main element 21 is made of a material having a yield point different from that of the material of the end portions 30a, 30b. More specifically, a material having a higher yield point than that of the material of the end portions 30a, 30b is used for the main element 21.

In the cab 10 having the connecting member 20D of the fifth embodiment, since the main element 21 is made of a material having a higher yield point than that of the material of the end portions 30a, 30b, the main element 21 has increased structural strength and can withstand even if a large transverse load is imposed. If a greater external force is imposed on the cab 10 in the event of an overturn, the joints 31a, 31b that are the boundaries between the main element 21 and the end portions 30a, 30b serve as the deformation inducing parts so that the stress is concentrated on the joints 31a, 31b, commencing buckling and deformation thereat. Accordingly, a protective space for the operator is created similarly to the first to fourth embodiments.

Although notches such as described earlier in the first to fourth embodiments are not provided in the fifth embodiment, notches may be provided in addition to the joints 31a, 31b.

Although the main element 21 is made of a material different from that of the end portions 30a, 30b in the fifth embodiment, it may be made of the same material as that of the end portions 30a, 30b and jointed by welding to the end portions 30a, 30b at the joints 31a, 31b. In this case, if a great transverse load is imposed, the weld joints 31a, 31b serve as the deformation inducing parts, causing buckling and deformation.

While the main element 21 is joined to the end portions 30a, 30b by welding in the fifth embodiment, it may be joined by an adhesive or a bolt and nut.

While the number of deformation inducing parts provided for the connecting member is two in the foregoing embodiments, the number of deformation inducing parts may be one. Further, it is also possible to provide the above-described deformation inducing parts in the connecting members 15, 16, 18 and auxiliary members which are disposed in other positions than the position above the head of the operator sitting on the operator's seat.

Although the foregoing embodiments have been described in the context of a cab having a skeletal structure where the front vertical supporting members 11 are connected to the rear vertical supporting members 12 at their upper ends by means of the longitudinal members 13, it is apparent that the invention is applicable to other structures such as a skeletal structure in which the front vertical supporting members and the longitudinal members are integrally molded or a skeletal structure in which the front vertical supporting members, the longitudinal members and the rear vertical supporting members are all integrally molded.

Although the invention has been described with a cab for use in hydraulic excavators in the foregoing embodiments, the invention is not necessarily limited to this but is applicable to other construction machines such as wheel loaders, crawler cranes and bulldozers.

The invention claimed is:

1. A cab for a construction machine, comprising:
   a transverse member which forms a portion of a framework of the cab, and which has at least one deformation inducing part located at a position outside a projected area of a central part of an operator's seat,
   wherein the transverse member is shaped to form a downwardly open substantially U-shaped channel and includes a downwardly extending flange provided along a longitudinal direction, and wherein the at least one deformation inducing part comprises at least one notch formed along a lower edge of the downwardly extending flange of the transverse member facing the operator's seat such that the notch is open downward, but not upward, on an underside of the transverse member.

2. The cab for a construction machine according to claim 1, wherein the transverse member is disposed above the operator's seat.

3. The cab for a construction machine according to claim 1, wherein said transverse member comprises:
   a main element that opens at its underside to form the substantially U-shaped channel;
   a horizontal portion formed by horizontally bending a lower end of one side of the main element; and
   a strengthening rib arranged on an underside of the main element and extending over substantially the entire longitudinal length thereof.

4. The cab for a construction machine according to claim 2, wherein said transverse member comprises:
   a main element that opens at its underside to form the substantially U-shaped channel;
   a horizontal portion formed by horizontally bending a lower end of one side of the main element; and
   a strengthening rib arranged on an underside of the main element and extending over substantially the entire longitudinal length thereof.

5. The cab for a construction machine according to claim 1, wherein the at least one notch of the deformation inducing part comprises two notches spaced apart from one another.

6. The cab for a construction machine according to claim 5, wherein the notches are spaced apart from longitudinal ends of the transverse member.

7. The cab for a construction machine according to claim 1, wherein the at least one notch has the shape of a circular arc.

8. The cab for a construction machine according to claim 1, wherein said transverse member comprises:
   a main element that opens at its underside to form the substantially U-shaped channel; and
   a horizontal portion formed by horizontally bending a lower end of one side of the main element;
   wherein the downwardly extending flange is located opposite to the horizontal portion.

9. The cab for a construction machine according to claim 8, wherein the at least one notch of the deformation inducing part comprises two notches spaced apart from one another.

10. The cab for a construction machine according to claim 9, wherein the notches are spaced apart from longitudinal ends of the downwardly extending flange of the transverse member.

* * * * *